(12) United States Patent
Lammi

(10) Patent No.: US 11,884,572 B2
(45) Date of Patent: Jan. 30, 2024

(54) METHOD FOR BENDING GLASS SHEETS IN AN APPARATUS, AND APPARATUS FOR BENDING GLASS SHEETS

(71) Applicant: HEVA Schweiz AG, Meggen Kanton Luzern (CH)

(72) Inventor: Esa Ensio Lammi, Tampere (FI)

(73) Assignee: HEVA Schweiz AG, Meggen Kanton Lucerne (CH)

( * ) Notice: Subject to any disclaimer, the term of this patent is extended or adjusted under 35 U.S.C. 154(b) by 336 days.

(21) Appl. No.: 16/525,831

(22) Filed: Jul. 30, 2019

(65) Prior Publication Data

US 2020/0039861 A1   Feb. 6, 2020

(30) Foreign Application Priority Data

Jul. 31, 2018   (FI) ..................................... 20185664

(51) Int. Cl.
*C03B 23/02* (2006.01)
*C03B 23/03* (2006.01)

(52) U.S. Cl.
CPC ...... *C03B 23/0302* (2013.01); *C03B 23/0307* (2013.01)

(58) Field of Classification Search
None
See application file for complete search history.

(56) References Cited

U.S. PATENT DOCUMENTS

| 4,252,552 | A | * | 2/1981 | Frank | .................. C03B 23/0357 |
| | | | | | 65/106 |
| 4,318,728 | A | * | 3/1982 | Claassen | ............... C03B 23/031 |
| | | | | | 65/106 |

(Continued)

FOREIGN PATENT DOCUMENTS

| CN | 1472149 | 4/2004 |
| CN | 202576209 | 12/2012 |

(Continued)

OTHER PUBLICATIONS

Finnish Action Search Report in corresponding Finnish Application No. 20185664 dated Jan. 31, 2019. 1 page.

*Primary Examiner* — Jodi C Franklin
(74) *Attorney, Agent, or Firm* — Leason Ellis LLP

(57) ABSTRACT

A method for bending glass sheets in an apparatus and an apparatus for bending glass sheets, the apparatus comprising at least one compartment heating the glass sheet to be bent, a press bending station which comprises a male mould to bend a glass sheet, brought through at least one compartment heating the glass sheet to the press bending station by pressing it, and at least one conveyor to transport a mould trolley that may be provided with a female mould and a glass sheet placed on the female mould through the at least one compartment heating the glass sheet to the press bending station. In order to replace the male mould in use at the press bending station with a male mould to be used next, a trolley is delivered which is suitable for carrying the male mould to the press bending station to receive the male mould to be removed from use on said trolley to carry the male mould to be removed from use away from the press bending station by said trolley, and a trolley is delivered which is suitable for carrying a male mould and provided with the male mould to (Continued)

be brought into use to the press bending station in order to carry the male mould to be brought into use to the press bending station.

9 Claims, 5 Drawing Sheets

(56) References Cited

U.S. PATENT DOCUMENTS

| | | | | |
|---|---|---|---|---|
| 4,737,182 A * | 4/1988 | Fecik | ................ | C03B 23/0302 65/102 |
| 4,813,993 A * | 3/1989 | Letemps | ............ | C03B 23/0302 65/273 |
| 5,087,280 A * | 2/1992 | Fuchigami | .............. | C03B 23/03 180/125 |
| 5,147,440 A * | 9/1992 | Leponen | ................ | C03B 23/03 65/273 |
| 5,290,999 A * | 3/1994 | Kuster | ............... | C03B 23/0302 65/118 |
| 5,320,661 A * | 6/1994 | Fecik | .................. | C03B 35/145 65/104 |
| 5,340,375 A * | 8/1994 | Anttonen | .............. | C03B 35/145 65/273 |
| 5,364,436 A * | 11/1994 | Montonen | ............... | C03B 23/03 65/106 |
| 5,900,034 A * | 5/1999 | Mumford | ............ | C03B 27/0445 425/453 |
| 5,906,668 A * | 5/1999 | Mumford | ............ | C03B 23/0302 65/357 |
| 5,917,107 A * | 6/1999 | Ducat | ................ | C03B 23/0302 65/273 |
| 5,925,162 A * | 7/1999 | Nitschke | ............. | C03B 23/0302 65/319 |
| 6,032,491 A * | 3/2000 | Nitschke | ................ | C03B 40/005 425/186 |
| 7,735,339 B2 * | 6/2010 | Bando | ................. | B65G 49/064 65/64 |
| 2003/0106340 A1 * | 6/2003 | Nitschke | ............... | C03B 40/005 65/273 |
| 2005/0044896 A1 * | 3/2005 | Frank | ..................... | C03B 23/03 65/273 |
| 2007/0283720 A1 * | 12/2007 | Guillaume | ......... | C03B 23/0357 65/287 |
| 2008/0134722 A1 * | 6/2008 | Balduin | ............. | C03B 23/0302 65/106 |
| 2009/0084138 A1 * | 4/2009 | Imaichi | ............... | C03B 23/0357 65/106 |
| 2015/0232367 A1 * | 8/2015 | Joubaud | ................. | C03B 29/08 65/169 |
| 2018/0319697 A1 * | 11/2018 | Nitschke | ............. | C03B 23/0302 |
| 2020/0247705 A1 * | 8/2020 | Palmantier | ............ | C03B 35/202 |
| 2020/0299176 A1 * | 9/2020 | Schnabel, Jr. | ...... | C03B 23/0357 |
| 2021/0147277 A1 * | 5/2021 | Palmantier | .......... | C03B 23/0307 |
| 2021/0179473 A1 * | 6/2021 | Palmantier | ............ | C03B 23/03 |
| 2021/0284565 A1 * | 9/2021 | Thellier | ................ | C03B 25/025 |

FOREIGN PATENT DOCUMENTS

| | | |
|---|---|---|
| CN | 105555719 | 5/2016 |
| GB | 2185974 A | 8/1987 |
| TW | 201625498 | 7/2016 |
| WO | WO 2017/079251 | 5/2017 |

\* cited by examiner

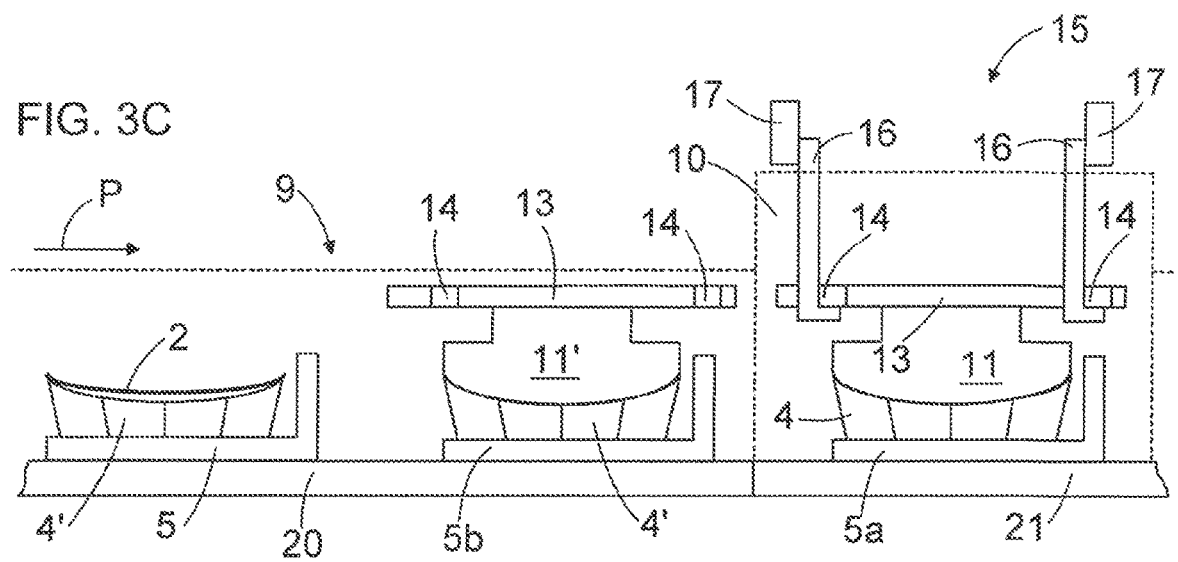
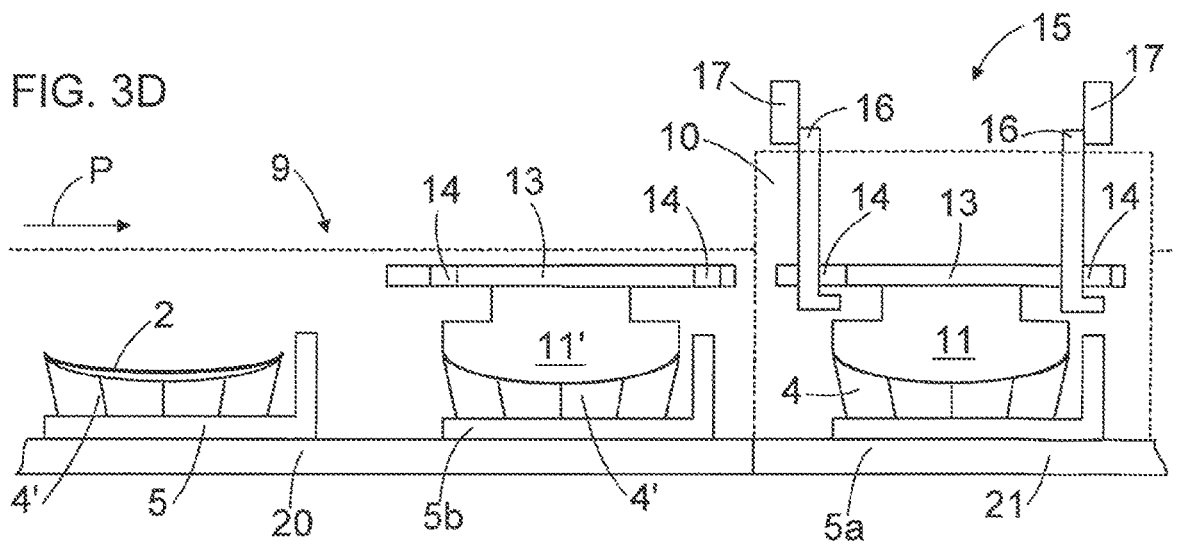
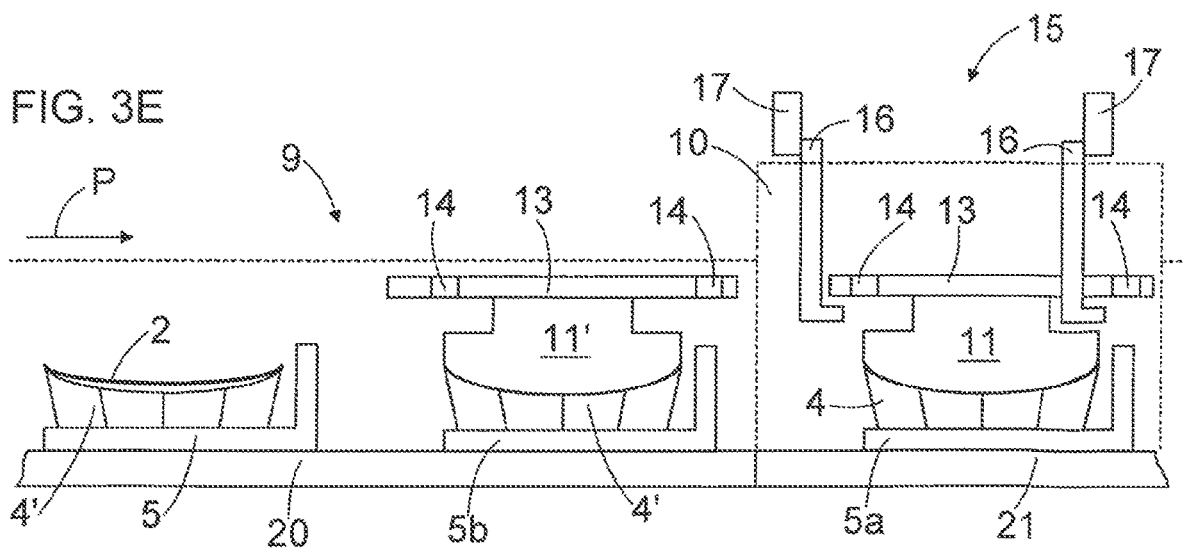

METHOD FOR BENDING GLASS SHEETS IN AN APPARATUS, AND APPARATUS FOR BENDING GLASS SHEETS

CROSS-REFERENCE TO RELATED PATENT APPLICATION

This application claims the benefit of priority to Finnish Patent Application number 20185664 filed Jul. 31, 2018, which is incorporated by reference in its entirety.

BACKGROUND OF THE INVENTION

The invention relates to an apparatus for bending glass sheets and a method in said apparatus.

An apparatus for bending glass sheets comprises at least one compartment heating the glass sheet, at least one conveyor to transport a mould trolley that may be provided with a female mould and a glass sheet placed in the female mould through the at least one compartment heating the glass sheet to a press bending station. The press bending station comprises a male mould to bend a glass sheet, brought through at least one compartment heating the glass sheet, to the press bending station, by pressing it by means of the male mould.

When the bending profile of the bent glass sheet to be produced changes, the male mould at the press bending station needs to be replaced by a new male mould corresponding to the bending profile of the glass introduced for production. This takes place by opening the doors of the press bending station and by replacing the male mould, only, or a mould block comprising the male mould and fasteners or other means, by a new male mould or mould block including a new male mould. The replacement work is usually performed by using a forklift or another lifting and transferring device. Because a very high temperature prevails at the press bending station while it is operational, the press bending station has to be allowed to cool down before the male mould can be changed. To lower the total energy consumption of production, other heated parts of the apparatus are allowed to cool down at the same time. After the replacement work of the male mould, both the press bending station and other heated parts of the apparatus must be re-heated to their operational temperature before the apparatus is ready for use again. The total time for the replacement work, including the cooling down and reheating of the apparatus, is several hours, or it can even be longer than a work shift.

BRIEF DESCRIPTION OF THE INVENTION

It is an object of the invention to establish a new type of solution for replacing a male mould in a press bending station used for press bending glass sheets.

The method according to the invention is characterised by what is stated in the independent claim 1.

The apparatus according to the invention is characterised by what is stated in the independent claim 8.

The invention is based on picking up a male mould to be removed from use from a press bending station by a trolley suited to its transport, and delivering a male mould to be brought into use to the press bending station by a trolley suited to its transport.

One of the advantages is that there is no need to stop the apparatus, and the press bending station need not be opened for the duration of the male mould replacement work. Both the press bending station and also the other parts of the apparatus to be heated may be kept heated all the time without the need to cool them down and then reheat them again. The time it takes to replace the male mould is minimized, and is in practice the same as the time that it takes to replace the female moulds corresponding to the bending profile of the glass introduced for production.

Some embodiments of the invention are presented in the dependent claims.

BRIEF DESCRIPTION OF THE FIGURES

The invention is now described in closer detail in connection with preferred embodiments and with reference to the accompanying drawings, in which FIGS. 3A to 3K are schematic views of an embodiment for replacing a male mould to be removed from use with a male mould to be used next.

For reasons of clarity, some embodiments of the invention are illustrated in the Figures in a simplified form. In the figures, like reference numerals identify like elements.

DETAILED DESCRIPTION OF THE INVENTION

Figure 1:
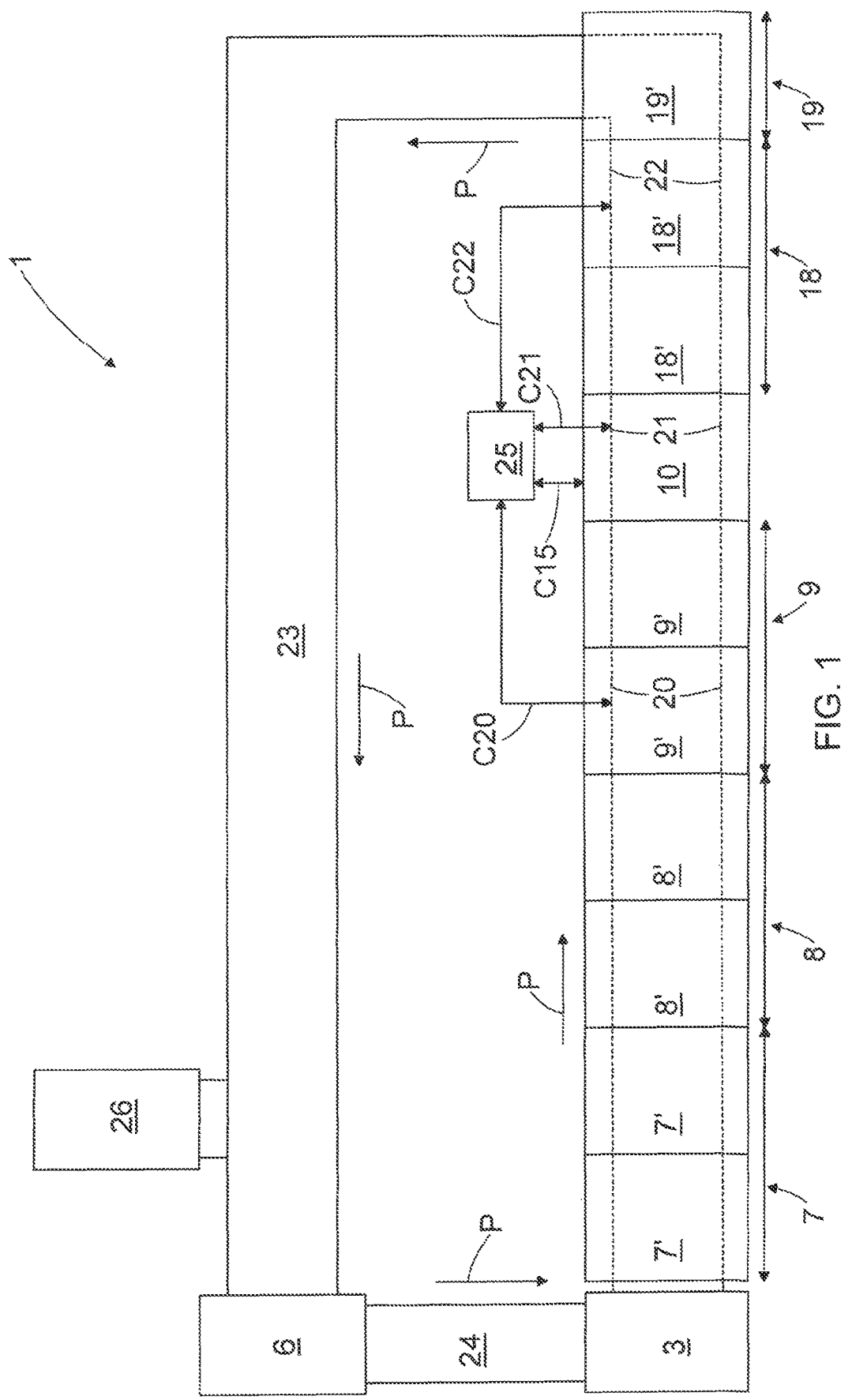
FIG. 1 is a schematic top view of an apparatus for bending glass sheets.
Figure 2:
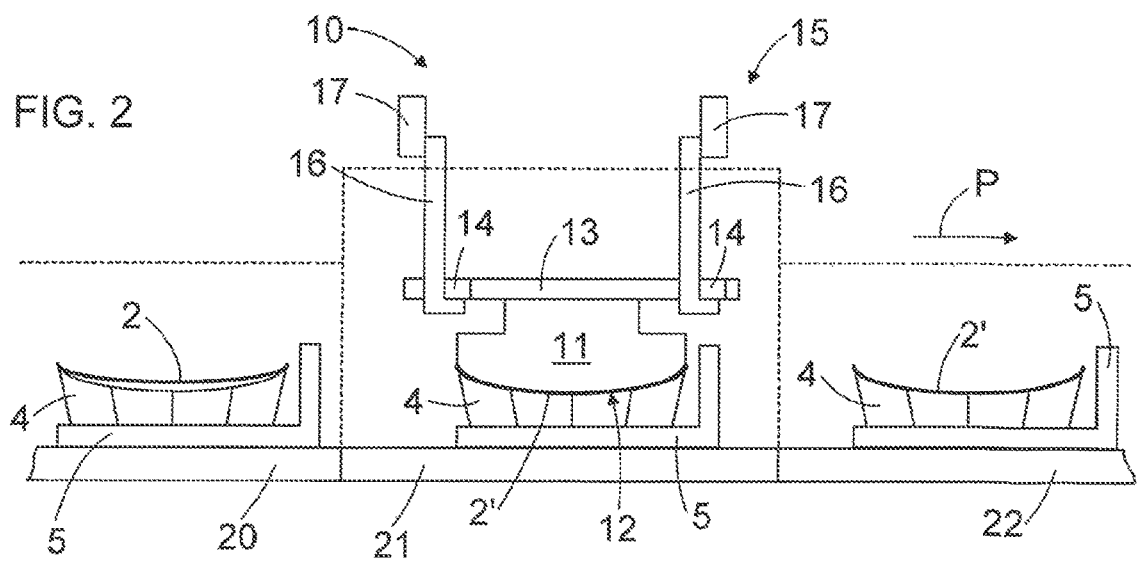
FIG. 2 is a schematic side view of a press bending station.

With reference to FIGS. 1 and 2, FIG. 1 is a schematic top view of an apparatus 1 for bending glass sheets 2, and FIG. 2 is a schematic side view of a press bending station 10 used in the apparatus 1 and in which the glass sheet 2 is bent into the desired shape by pressing it by a male mould and female mould. The apparatus 1 shown in FIG. 1 may be, for example, a glass bending furnace for manufacturing windscreens of vehicles, or for manufacturing bent glassed for other uses.

The apparatus 1 comprises a loading station 3 where the glass sheet 2 to be bent is loaded onto a mould trolley 5 provided with a female mould 4. The mould trolley may also be called for a mould wagon or a mould carriage. The mould trolley 5 transports the glass sheet 2 to be bent, placed to be supported by the female mould 4, along conveyors provided in the apparatus 1 through the apparatus 1 all the way to an unloading station 6. At the unloading station 6, the glass sheet 2' bent in the apparatus 1 is removed from the female mould 4 on the mould trolley 5.

As the glass sheet 2 is being bent, the mould trolley 5 and the glass sheet 2 to be bent thereon supported by the female mould 4 are moved from the loading station 3 to a preheating compartment 7 which comprises at least one preheating block 7' for preheating the glass sheet 2 to be bent before it is bent. The preheating blocks 7' comprise heating means, not shown in the Figures for reasons of clarity but obvious for a person skilled in the art, which direct a heating effect both on the glass sheet 2 to be bent and the female mould 4. Said heating means may be, for example, radiation heaters such as electric resistances. The temperature in the preheating compartment 7 may be 150 to 250 degrees, for example.

Next, the glass sheet 2 is transferred, in the direction of production of the apparatus 1, indicated by the arrows denoted by the reference mark P, still supported by the mould trolley 5 and the female mould 4 thereon, to a pre-bending compartment 8 which comprises at least one pre-bending block 8'. The pre-bending blocks 8' also comprise heating means, not shown in the Figures for reasons of clarity but obvious for a person skilled in the art, which direct more heating effect both on the glass sheet 2 to be bent and the female mould 4. Said heating means may be, for example, radiation heaters such as electric resistances. The temperature in the pre-bending compartment 8 may be 350 to 450 degrees, for example, which results in that the glass of the originally solid glass sheet 2 begins to soften and the glass sheet 2 begins to bend downwards at its middle due to the gravity exerted on it, while the edges of the glass sheet 2 rest onto the outer periphery of the female mould 4.

From the pre-bending compartment 8 the glass sheet 2 is moved, still supported by the same mould trolley 5 and the female mould 4 therein, to a bending compartment 9 which comprises at least one bending block 9'. The bending blocks 9' also comprise heating means, not shown in the Figures for reasons of clarity but obvious for a person skilled in the art, which further direct more heating effect both on the glass sheet 2 to bent and the female mould 4. Said heating means may be, for example, radiation heaters such as electric resistances. The temperature in the bending compartment 9 may be approximately 600 to 620 degrees, for example, which results in that the glass of the glass sheet 2, which began to soften as early as the pre-bending compartment 8', softens more and the glass sheet 2 bends significantly downwards at its middle due to the gravity exerted on it, at this stage possibly even conforming to some extent to the shapes defined by the female mould 4.

The mould trolley 5 moves through the preheating compartment 7, pre-bending compartment 8, and bending compartment 9 supported by a conveyor 20, or the first conveyor 20. The conveyor 20 is shown very schematically in FIG. 1 with dotted lines and it may be comprised of one or more conveyor parts. The conveyor 20 may be a roll conveyor, for example.

From the bending compartment 9, the glass sheet 2, which has significantly bent downwards by way of gravity, moves still supported by the same mould trolley 5 and the female mould 4 thereon to a press bending station 10 where the glass sheet 2 to be bent is pressed to its final shape between a male mould 11, provided in the press bending station 10, and the aforementioned female mould 4.

The press bending station 10 comprises a male mould 11 which is movable upwards and downwards, and has a form surface 12. As the male mould 11 is pressed downwards against the female mould 4 and the softened glass sheet 2 thereon, the form surface 12 together with the female mould 4 produces the desired final shape for the glass sheet 2 to be bent when the glass sheet 2 is compressed between the male mould 11 and female mould 4. The male mould 11 is fixed to a supporting plate 13 that may have, for example, as in the schematic example shown in FIG. 2, protrusions 14, directed upwards from a paper surface in the reader's direction, by means of which the male mould 11 may be suspended from brackets 16 that are part of the operating mechanism 15 of the male mould 11. So, the operating mechanism 15 of the male mould 11 is meant to support, lower and lift the male mould 11 at the press bending station 10. The operating mechanism 15 additionally includes actuators 17, shown very schematically in FIG. 2, to lower and raise the brackets 16 and by means of them the male mould 11. Said actuators 17 may be mechanically operating, or electric, compressed air or hydraulically operating, obvious for a person skilled in the art, and possibly actuators 17 making use of gravity that the male mould 11 is subjected to during a lowering motion of the male mould 11. The operating mechanism 15 and the associated brackets 16 and actuators 17, as well as the male mould 11 and the support plate 13 fixed to it may be implemented in a number of ways so that the male mould 11 may be brought to be supported by the operating mechanism 15 and to be lowered and raised by means of the operating mechanism 15.

The press bending station 10, too, comprises heating means, not shown in the Figures for reasons of clarity but obvious for a person skilled in the art, which direct a heating effect on the male mould 11 and the glass sheet 2 to be bent, as well as the female mould 4, whereby the male mould 11, glass sheet 2 to be bent, and female mould 4 are at a temperature suitable for press bending. Said heating means may be, for example, radiation heaters such as electric resistances. The temperature at the press bending station 10 may be approximately 600 to 620 degrees, for example.

The press bending station 10 comprises a conveyor 21, or a second conveyor 21, to receive the mould trolley 5 at the press bending station 10, to transport it through the press bending station 10 and to send it on to the process steps following the press bending station 10. The conveyor 21 is shown in FIG. 1 very schematically with dotted lines, and it is formed of advantageously one conveyor part, but may be formed of more conveyor parts. The conveyor 21 may be a roll conveyor, for example. The conveyor 21 may be separate and separately controlled in relation to at least one or all other conveyors of the apparatus 1. In such a case, the conveyor 21 may be used in the production direction P of the apparatus 1, or the opposite direction in relation to it, to bring the mould trolley 5 at the press bending station 10, or the trolleys 5a, 5b described below and to be used for replacing the male mould, to an appropriate position in each case at the press bending station 10 so that the operation of the other conveyors of the apparatus 1 is not affected, or the passage of the trolleys on them.

From the press bending station 10, the bent glass sheet 2' moves, still supported by the same mould trolley 5 and the female mould 4 thereon, to an Annealing compartment 18 which comprises at least one Annealing block 18'. In the Annealing compartment 18, the bent glass sheet 2' is controllably cooled down so that a tensile/compression stress of a specific level may be formed at the edge area of the glass sheet 2'. The Annealing blocks 18' additionally comprise cooling means, not shown in the Figures for the sake of clarity but obvious for a person skilled in the art, such as convection cooling means such as blowing devices or channels blowing cooled-down air against the edge areas of the glass sheet, by means of which cooling air may be guided to the edge areas of the glass sheet to meet the aforementioned stress values. The Annealing blocks 18' may additionally comprise heating means, not shown in the Figures for the sake of clarity but obvious for a person skilled in the art, by means of which the cooling rate of the glass sheet 2' may be controlled in a managed way by directing a heating effect on it so that the cooling rate of the glass sheet 2' does not become too fast. Said heating means may be, for example, radiation heaters such as electric resistances. In the Annealing compartment 18, the goal is the cool down the glass sheet 2' controllably from the aforementioned temperature of 600 to 620 degrees at the press bending station 10 to the temperature to approximately 500 degrees in order to establish the aforementioned tensile/compression stress. The ceiling structures of the bending compartment 9, press bending station 10, and Annealing compartment 18, as well as the vertical interfaces of the press bending station 10 in relation to the bending compartment 9 and Annealing compartment 18 are shown with dotted lines in FIG. 2, and FIGS. 3A to 3K below. The operating mechanism 15 of the male mould, and the parts possibly associated with the mechanism, may be located in their entirety within the press bending station 10, or they may partly extend outside the wall and ceiling structures of the press bending stations 10, as is schematically shown in FIGS. 2 and 3A to 3K.

From the Annealing compartment 18, the bent glass sheet 2' moves, still supported by the same mould trolley 5 and the female mould 4 thereon, to a cooling compartment 19 which comprises at least one cooling block 19'. The cooling blocks 19' additionally comprise cooling means, not shown in the Figures for the sake of clarity but obvious for a person skilled in the art, to direct a cooling effect on the bent glass sheet 2'. Said cooling mans may be convection cooling means, for example, such as blowing device blowing cooled-down air against the glass sheet 2'.

The mould trolley 5 passes through the Annealing compartment 18 and cooling compartment 19, supported by a conveyor 22, or a third conveyor 22. The conveyor 22 is shown very schematically in FIG. 1 with dotted lines and it may be comprised of one or more conveyor parts. The conveyor 22 may be a roll conveyor, for example.

From the cooling compartment 19, the bent glass sheet 2' moves, still supported by the same mould trolley 5 and the female mould 4 thereon, along a conveyor 23, or fourth conveyor 23, to an unloading station 6. The conveyor 23 may be a roll conveyor, for example, and it may consist of one or more conveyor parts. At the unloading station 6, the bent glass sheet 2' is removed from the female mould 4. Following this, the mould trolley 5 and the female mould 4 thereon are moved by a conveyor 24, or a fourth conveyor 24, from the unloading station 6 to a loading station 3. The conveyor 24 may be a roll conveyor, for example, and it may consist of one or more conveyor parts. At the loading station 3, a new glass sheet 2 to be bent is placed to be supported by the female mould 4 on the mould trolley 5, and the mould trolley 5 is sent on to travel the working cycle described in the above with the new glass sheet 2 to be bent.

FIG. 1 further shows very schematically a control unit 25, which is adapted to control, by control connections indicated by arrows C15, C20, C21, C22 in FIG. 1, at least the operation of the operating mechanism 15 of the male mould and the conveyors 20, 21, 22 during, for example, the replacement of the male mould shown below in FIGS. 3A to 3K. The apparatus 1 may comprise at least one second control unit 1 to control other functions of the apparatus 1. Alternatively, the control unit 25 may be a control unit controlling all the compartments, blocks, stations of the apparatus 1 as well as devices and functions therein.

The above describes, with reference to FIGS. 1 and 2, the process cycle of one mould trolley 5 and the female mould 4 and glass sheet 2, 2' on it in the apparatus 1 from the loading of the glass sheet 2 to be bent at the loading station 3 all the way to the removal of the bent glass sheet 2' at the unloading station 6. For a person skilled in the art, it is obvious that, as indicated in FIG. 2, that in the apparatus 1 numerous mould trolleys 5 run successively in the apparatus 1 advantageously so that each block or station has at least one mould trolley 5, each of which has a female mould 4 and on it, depending on the process step at which the mould trolley 5 is running at the moment in time in question, either a glass sheet 2 to be bent or a glass sheet 2' already bent.

FIG. 1 further shows, most schematically, a mould replacement station 26. At the mould replacement station 26, new female moulds 4' that correspond to the bending profile of the subsequent glass sheet to be manufactured may be changed on the mould trolleys 5, as the bending profile of the glass sheet to be manufactured changes.

When the bending profile of the glass sheet to be manufactured changes, it is also necessary replace the mould with a male mould 11', corresponding to the bending profile of the subsequently manufactured glass sheet, at the press bending station 10. With reference to FIGS. 3A to 3K, the following describes an embodiment according to the solution to replace the male mould 11 to be removed from use with the male mould 11' to be used next. The apparatus 1 is not turned off for the duration of the replacement, which among other things means that the operation of the preheating compartment 7, pre-bending compartment 8, and bending compartment 9 as well as the heating means therein is kept substantially unchanged during the replacement of the male mould. However, some of the functions of the apparatus 1, such as the operation of the Annealing compartment 18 and cooling compartment 19 as well as the heating and cooling devices in them, may be limited to some extent during the replacement of the male mould.

Figure 3A:
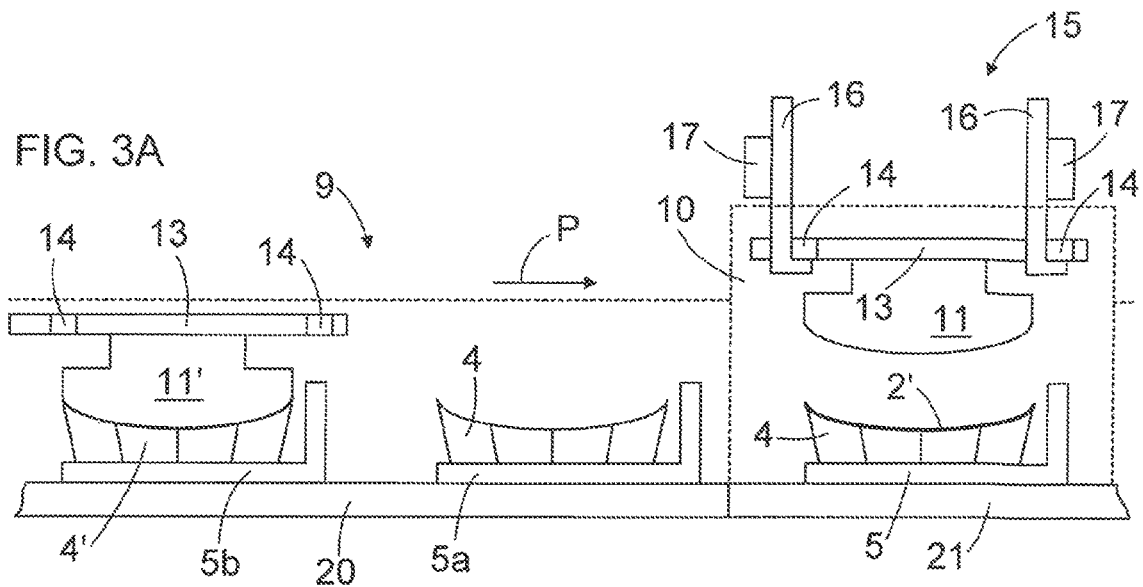

FIG. 3A shows a situation where the last, at least for now, glass sheet 2' bent with the male mould 11 to be removed from use is still at the press bending station 10, and is supported by the mould trolley 5 and the female mould 4 thereon. The male mould 11 and the operating mechanism 15 are in it at the upper position to which they are raised following the downwards press bending motion.

FIG. 3A further shows a first trolley 5a waiting in the bending compartment 9 and suitable for carrying the male mould, which is meant to receive the male mould 11 to be removed from use at the press bending station 10 and to carry it out of the press bending station 10. Said trolley 5a is arranged to run on the production line as the immediately next one in relation to the mould trolley 5 carrying the last glass sheet 2' bent with the male mould 11 to be removed from use. The trolley 5a has thus passed through the preheating compartment 7, pre-bending compartment 8 and bending compartment 9 before it arrives at the press bending station 10 to receive the male mould 11 to be removed from use.

Figure 3B:
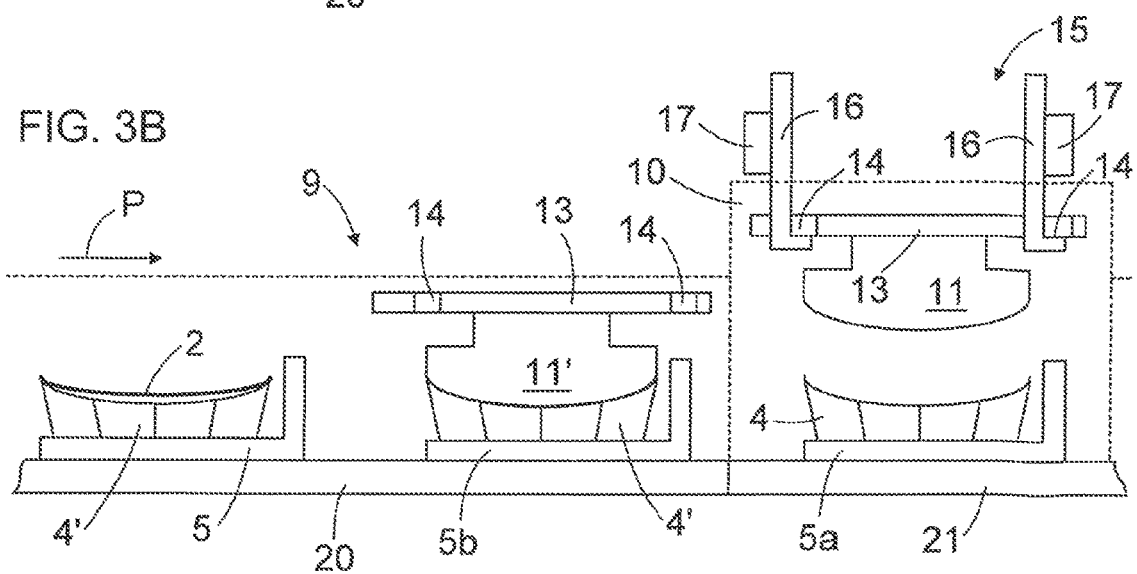

FIG. 3B further shows a second trolley 5b, waiting in the bending compartment 9, suitable for transporting a male mould and supporting the male mould 11' to be used next. So, the trolley 5b is intended to deliver the male mould 11' to be used next to the press bending station 10. Said trolley 5b is arranged to run on the production line as the immediate next one in relation to the trolley 5a receiving the male mould 11 to be removed from use. The trolley 5b has also passed through the preheating compartment 7, pre-bending compartment 8 and bending compartment 9 before it arrives at the press bending station 10 to deliver to it the male mould 11' to be used next. As the trolley 5b is running through the preheating compartment 7, pre-bending compartment 8 and bending compartment 9, the male mould 11' to be brought into use is preheating all the time as a result of the operating heating means of the preheating compartment 7, pre-bending compartment 8 and bending compartment 9, because the apparatus 1 is not turned off for the duration of the replacement of the male mould.

The first trolley 5a suitable for carrying a male mould, so the first male mould replacement trolley 5a, and the female mould 4 on it, picking up the male mould 11 to be removed from use from the press bending station 10, and the second trolley 5b suitable for carrying a male mould, so the second male mould replacement trolley 5b and the female mould 4 on it, transporting the male mould 11' to be used to the press bending station 10 may be conventional mould trolleys 5 and female moulds 4, 4' normally used in the production of glass sheets to be bent in the apparatus 1, if the total weight of the male mould 11, 11' and supporting plate 13 does not exceed the carrying capacity of mould trolleys 5 and female moulds 4, 4' normally used in production. So, the female mould 4 on the first replacement trolley 5a may be, insofar as the profile is concerned, a female mould 4 corresponding to the male mould 11 to be removed from use, and the female mould 4' on the second replacement trolley 5b may be, insofar as the profile is concerned, a female mould 4' corresponding to the male mould 11' to be brought into use. The female moulds 4, 4' form a support structure for the male moulds 11, 11', supporting the male moulds 11, 11' during the trolley transport, if there is a need for a support structure in the trolleys 5a, 5b for the male moulds 11, 11' for the duration of the trolley transport. Said female moulds 4, 4' may also be replaced by other support structures supporting the male mould 11, 11' during a trolley transport, which may be for example supports structures suitable for all the male moulds in use, if there is a need for support structures of the male moulds 11, 11' for the duration of their trolley transport. The aforementioned support structures, such as the female moulds 4, 4', are thus not necessary, if the male support 11, 11' runs steadily on the trolley 5a, 5b without any support structures.

According to an embodiment of replacement trolleys 5a, 5b, the replacement trolleys 5a, 5b and the female mould 4, 4' used on them may be custom-made, such as structurally reinforced trolleys and moulds, designed to cope with the total weight of the male mould 11, 11' and its support plate 13. These custom-made replacement trolleys 5a, 5b may brought into use for the duration of the male mould replacement, only, that is, to carry the male mould 11 removed from use away from the press bending station 10 and to carry the male mould 11' to be brought into use to the press bending station 10. The female moulds 4, 4' referred to in this paragraph may also be replaced by other support structures supporting the male mould 11, 11' during a trolley transport, which may be, for example, general-purpose support structures suitable for all the male moulds in use, if there is a need for support structures to support the male mould 11, 11' for the duration of its trolley transport. These custom-made replacement trolleys 5a, 5b may brought into use for the duration of the male mould replacement from the mould replacement station 26.

The custom-made replacement trolleys 5a, 5b referred to in the preceding paragraph and the custom-made female trolleys 4, 4' possibly used on them may also be trolleys and female moulds used all day long in production activities. In this case, the custom-made replacement trolleys and the custom-made female moulds 4, 4' on them form, from among the mould trolleys 5 and female moulds 4, 4' in use, the specific trolleys and possibly used support structures that are specifically used in replacing the male moulds 11, 11'.

FIG. 3B shows the situation in the male mould replacement where, by using the conveyors 20, 21, 22, the mould trolley 5 carrying the last glass sheet 2 bent with the male mould 11 to be removed from use has been moved forward to the Annealing compartment 18, not shown in FIG. 3B but visible in FIG. 2, for example, and the trolley 5a receiving the male mould 11 to be removed from use has been moved to the press bending station 10 under the male mould 11 to be removed from use. The male mould 11 is still at its upper position to which it was raised following the previous downward press bending motion. At the same time the trolley 5b carrying the male mould 11' to be brought into use has moved onward in the bending compartment 9, just as the mould trolley 5 provided with the female mould 4' corresponding to the bending profile of the glass sheet 2, to be used next.

The provision of the mould trolleys 5 included in the apparatus 1 with female moulds 4' corresponding to the glass sheet 2 bending profile to be used next and sending them forward in the apparatus 1 may be started immediately after the trolleys 5a, 5b suitable for the transport of male moulds 11, 11' have been sent forward in the apparatus 1 towards the press bending station 10. In such a case, the female moulds 4' in the mould trolleys 5 and the glass sheets 2 to be bent on them are preheated while they run through the preheating compartment 7, pre-bending compartment 8 and bending compartment 9 before they arrive at the press bending station 10 which is provided with the male mould 11' brought into use. The press-bending of the glass sheets 2 bent with the new bending profile may be commenced immediately after the male mould 11' brought into use has been installed in place at the press bending station 10.

According to an alternative way of using, the mould trolleys 5 following the replacement trolley 5b are only equipped with female moulds 4' corresponding to the new bending profile, but not yet with glass sheets 2 to be bent whereby the female moulds 4' may be allowed to pass one round through the apparatus 1 empty for their preheating before they are provided with glass sheets 2 to be bent.

FIG. 3C shows the situation of male mould replacement where the operating mechanism 15 of the male mould has been lowered to a first lower position during male mould replacement so that the male mould 11 to be removed from use is placed to be supported by the trolley 5a and the female mould 4 or other support structure possibly thereon. In this male mould replacement situation, the brackets 16 of the operating mechanism 15 are still fastened to the protrusions 14 of the support plate 13 of the male mould 11.

FIG. 3D shows such a situation of male mould replacement where the operating mechanism 15 of the male mould has been lowered further to a second lower position during the male mould replacement so that the brackets 16 of the operating mechanism 15 have detached from the protrusions 14 of the support plate 13 of the male mould 11, and are at a distance from the protrusions 14 of the support plate 13 of the male mould 11, below them. In this case, the male mould 11 removed from use is only supported by the trolley 5a and the female mould 4 or another support structure it may have.

FIG. 3E shows such a situation of male mould replacement where the trolley 5a carrying the male mould 11 to be removed from use has been moved on the conveyor 21 horizontally forward in the production direction P for a short distance, advantageously a distance corresponding to the horizontal extension of the protrusions 14 of the support plate 13 of the male mould 11, so that the operating mechanism 15 and the associated brackets 16 may be raised upwards past the protrusions 14 of the support plate 13 to the upper position during the male mould replacement without the brackets 16 of the operating mechanism 15 re-attaching to the protrusions 14 of the support plate 13 of the male mould 11 already supported by the trolley 5a. Said upper position during the male mould replacement may be the same position where the male mould and its operating mechanism 15 return after the press bending motion. Because the conveyor 21 of the press bending station 10 may be used independently of the conveyors 20 and 22, the trolleys 5a, 5b running on the conveyors 20 and 22 do not move forward in the apparatus 1 when the trolley 5a is moved on the conveyor 21 forward for the aforementioned short distance in the direction of the production direction P.

Figure 3F:
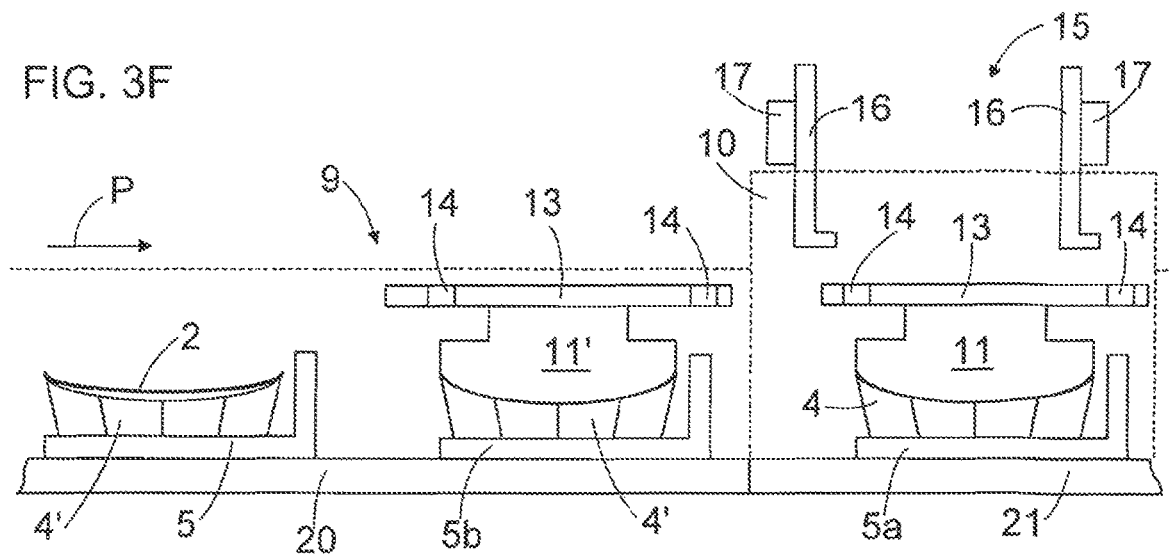

FIG. 3F shows such a situation of male mould replacement where the operating mechanism 15 and the associated brackets 16 have been raised past the protrusions 14 of the support plate 13 of the male mould 11 removed from use to their upper position without the brackets 16 of the operating mechanism 15 having been re-attached to the protrusions 14 of the support plate 13 of the male mould 11 supported by the trolley 5a. Following this, the male mould 11 removed from use may be shifted, supported by the trolley 5a, on the conveyors 21, 22 forward in the production direction P of the apparatus 1 away from the press bending station 10 towards the mould replacement station 26 in which, depending on the implementation of the trolley 5a, the trolley 5a and the male mould 11' removed from use are either moved aside from the apparatus 1 or the trolley 5a is equipped with the female mould 4' corresponding to the male mould 11' to be brought into use. The trolley 5a moves towards the mould replacement station 26 at the speed at which the mould trolleys 5 carrying the glass sheets 2' bent with the male mould 11 removed from use are arriving at the unloading station 6.

Figure 3G:
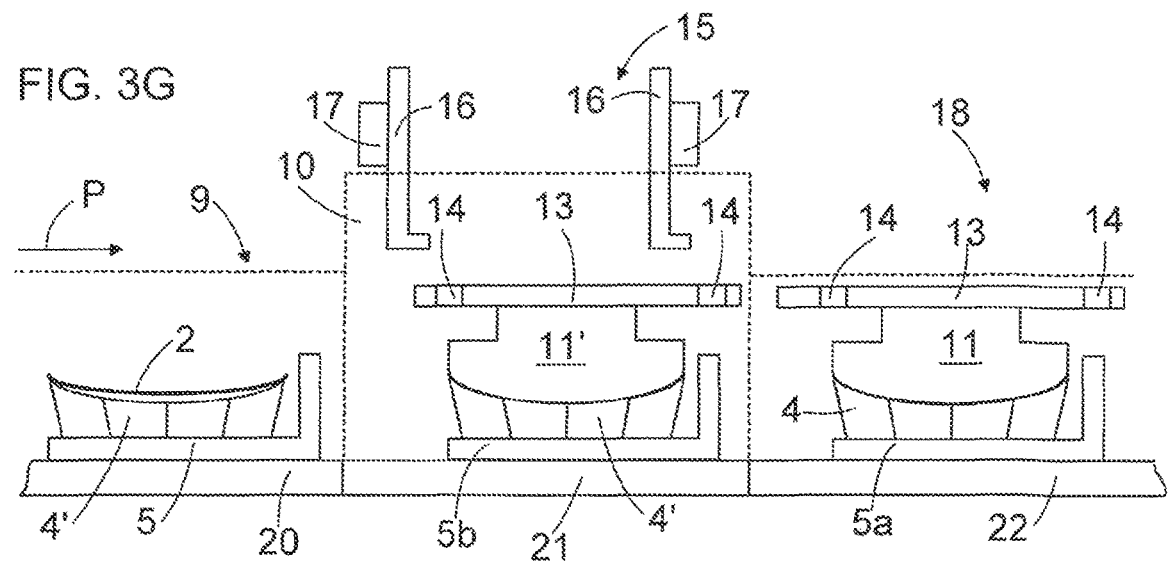

FIG. 3G shows such a situation of male mould replacement where the male mould 11 removed from use has been transferred by conveyors 21, 22 away from the press bending station 10 forward in the direction pointed by the production direction P of the apparatus 1 to the Annealing compartment 18 from which it moves forward on the trolley 5a along the conveyors 22, 23 to the mould replacement station 26. The trolley 5b carrying the male mould 11' to be brought into use has been moved further on conveyors 20, 21 to the press bending station 10. At the same time, the mould trolley 5 carrying the female mould 4' corresponding to the male mould 11' to be brought into use has moved forward in the bending compartment 9.

In the male mould replacement situation shown in FIG. 3G, the trolley 5b transporting the male mould 11' to be brought into use has been moved on the conveyor 21 horizontally to such a position in the direction indicated by the production direction P that the operating mechanism 15 and brackets 16 now without a male mould may be lowered to the aforementioned second lower position so that the brackets 16 do not hit the male mould 11' to be brought into use or its support plate 13.

Figure 3H:
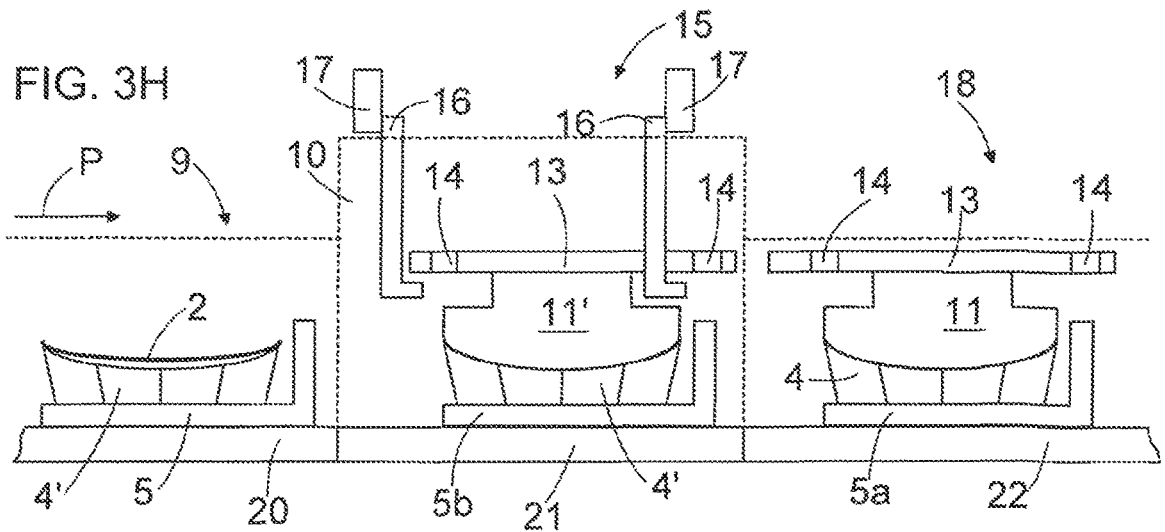

In the male mould replacement situation shown in FIG. 3H, the operating mechanism 15 of the male mould has been lowered to the aforementioned second lower position so that the brackets 16 in the operating mechanism 15 have not hit the male mould 11' to be brought into use or its support plate 13.

Figure 3I:
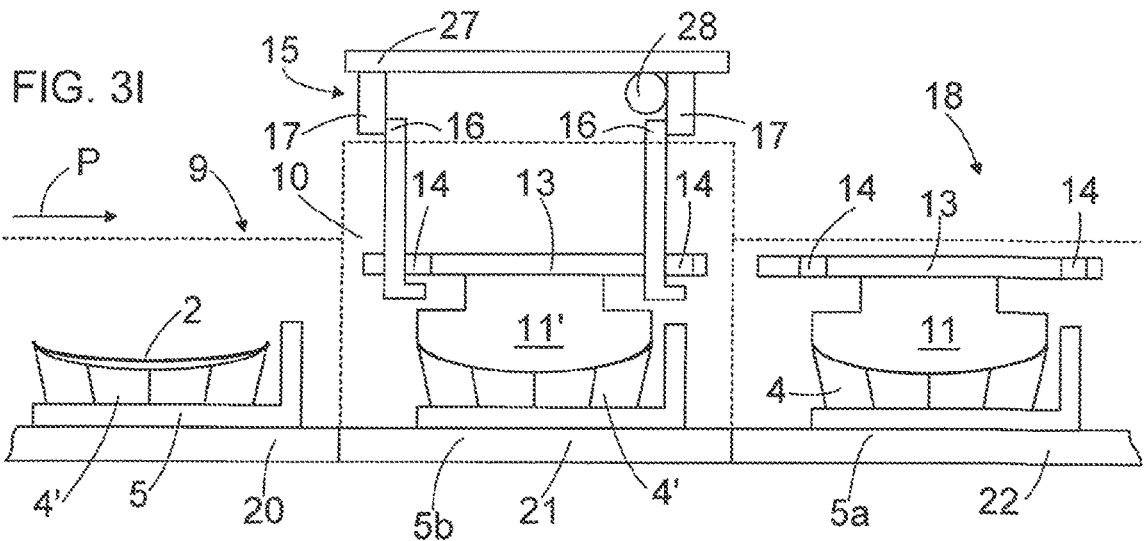

FIG. 3I shows such a situation of male mould replacement where the trolley 5b carrying the male mould 11' to be brought into use has been moved on the conveyor 21 horizontally backward, opposite the production direction P for a short distance, advantageously a distance corresponding to the horizontal extension of the protrusions 14 of the support plate 13 of the male mould 11, so that the operating mechanism 15 may be raised upwards so that the brackets 16 may attach to the protrusions 14 of the support plate 13 of the male mould 11' to be brought into use when the operating mechanism 15 is vertically raised upwards. Because the conveyor 21 of the press bending station 10 may be used independently of the conveyors 20 and 22, the trolleys 5, 5a running on the conveyors 20 and 22 do not move backward in the apparatus 1 when the trolley 5b is moved on the conveyor 21 horizontally backward in relation to the production direction P for the aforementioned short distance.

Figure 3J:
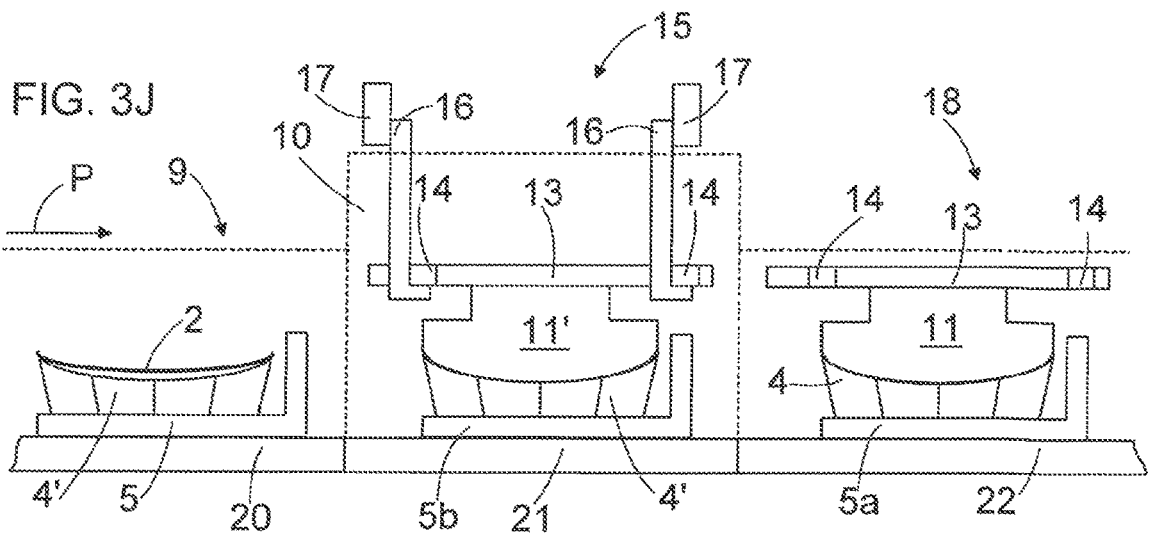

FIG. 3J shows such a situation of male mould replacement where the brackets 16 have been raised upwards to the first lower position so that the brackets 16 have attached to the protrusions 14 of the support plate 13 of the male mould 11' to be brought into use.

Figure 3K:
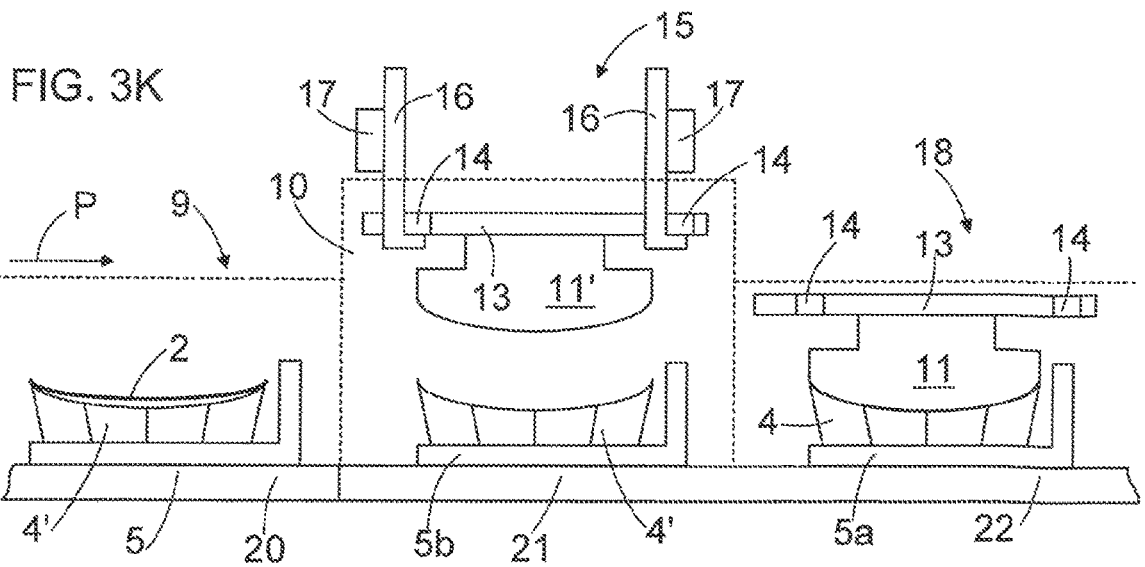

FIG. 3K shows such a situation of male mould replacement where the operating mechanism 15 has been raised to its upper position so that the male mould to be brought into use has moved up, supported by the operating mechanism 15, from the trolley 5b carrying the male mould 11' to be brought into use, whereby the trolley 5b may be moved away from the press bending station 10 forward to the production direction P indicated by the apparatus 1 so that the trolley 5b does not hit the operating mechanism 15 or the male mould 11' brought into use. Following this, the trolley 5b is moved onwards on the conveyors 22, 23 forward in the direction of the production direction P of the apparatus 1 towards the mould replacement station 26 where depending on the implementation of the trolley 5b, the trolley 5b and is moved aside from the apparatus 1 or, if need be, is equipped with the female mould 4' corresponding to the male mould 11' brought into use. The trolley 5b moves towards the mould replacement station 26 at the speed at which the mould trolleys 5 carrying the glass sheets 2' bent with the male mould 11 removed from use are arriving at the unloading station 6.

The solution set forth has a number of significant advantages.

One of the advantages is that the press bending station need not be opened for the duration of the replacement work of the male mould. Both the press bending station and also the other parts of the apparatus to be heated may be kept heated all the time without the need to cool them down and then reheat them again.

Therefore, a further advantage is that the apparatus need not be turned off, and the time the replacement work of the male mould takes is minimized, and is in practice the same as the time the replacement work of female moulds corresponding to the bending profile of the glass introduced for production takes.

A further advantage is that the male mould to be brought into use no longer needs preheating before it is placed in the press bending station, because the male mould to be brought into use warms up as it passes through the heated sections of the apparatus to the press bending station. This also means that there in no longer any need for separate preheating furnace of the male mould.

A further advantage is that the replacement work of the male mould no longer requires a forklift or another lifting or transferring device, and as relates to double-deck furnaces, in particular, there is no need any longer to work high up.

FIGS. 1 and 2 show a single decker apparatus 1 or glass bending furnace 1 for bending a glass sheet 2 by pressing. The positioning and other layout of compartments and stations in a single decker device may, however, differ from what was set forth in the above, whereby there may be some compartments or stations referred to in FIG. 1 and the above description missing from the apparatus 1, or the apparatus 1 may have other compartments or stations in addition to or instead of the compartments or stations referred to in FIG. 1 or the above description.

The above solution for replacing the male mould 11 at the press bending station 10 may also be applied to double-deck furnaces in which the top deck comprises compartments heating the glass sheet to be bent, such as the aforementioned preheating, pre-bending and bending compartments, and typically also a press bending station, and the bottom deck comprises, for example, compartments for cooling down the bent glass. In double-deck furnaces, the direction of travel of the glass sheet on the lower deck is typically the opposite in relation to the direction of travel of the glass sheet on the upper deck whereby the heat exiting the glass sheet on the lower deck may be utilised for heating the compartments on the upper deck.

In the embodiment shown in FIGS. 3A to 3K, the trolley 5a, 5b was shifted on the conveyor 21 horizontally forward in the direction of the production direction P, or backward in the opposite direction in relation to the production direction P, so that the brackets 16 of the operating mechanism 15 do not hit the mould 11, 11' or its support plate 13 when the operating mechanism 15 is not meant to attach to the mould 11, 11'. The same purpose is also achieved by arranging, instead of the trolleys 5a, 5b, the operating mechanism 15 to move horizontally forwards in the direction of the production direction P, or backward in the opposite direction in relation to the production direction P while the trolleys 5a, 5b remain stationary on the conveyor 21. In such a case, the operating mechanism 15 may be suspended from horizontal one or more support rails 27, for example, supported by which the operating mechanism 15 may move assisted by an actuator 28 arranged in connection with the operating mechanism 15 without, however, preventing the operation of the operating mechanism 15 in the vertical direction. Said support rail 27 and actuator 28 are schematically shown in FIG. 3I. It is furthermore possible that both the trolley 5a, 5b and the operating mechanism 15 are horizontally moved substantially simultaneously in relation to each other for the aforementioned purpose. The horizontal movement of the operating mechanism 15 may be controlled by the control unit 25, for example.

In the schematic example of the above figures, the glass sheet to be bent comprises one glass sheet layer, only, but it may also comprise two or more glass sheets one above the other, to be laminated into each other.

In the embodiment shown in the figures, the male mould is raised and lowered vertically both during press bending and the replacement of the male mould by means of the operating mechanism 15. However, the male mould could also be fixed to the press bending station during production, whereby the press bending of the glass sheet may be achieved, for example, by lifting the mould trolley and along with it the female mould and the glass sheet thereon upwards against the male mould by means of, for example, a raisable and lowerable conveyor of the press bending station. This means that the replacement of the male mould, too, may be accomplished in the similar way as described in the above, but instead of the operating mechanism of the male mould, by using said raisable and lowerable conveyor.

If a custom-made replacement trolley is used for replacing the male mould, instead of the two custom-made replacement trolleys presented in the above, it is possible to use one custom-made replacement trolley, only. In this embodiment, this empty custom-made replacement trolley is sent to the press bending station to pick up male mould to be removed from use from the press bending station. When the custom-made replacement trolley in question and the male mould removed from use on it arrive from the press bending station to the mould replacement station, the male mould removed from use is removed from the replacement trolley, and the male mould to be used next is loaded onto the replacement trolley, which the replacement trolley takes to the press bending station. The replacement time of the male mould, when one custom-made replacement trolley is used, is not in practice much longer than for two custom-made replacement trolleys, if following the sending of said custom-made replacement trolley to pick up a male mould to be removed from use from the press bending station, mould trolleys equipped with female mould corresponding to the male mould to be brought into use are sent after said empty trolley, whereby the female moulds in question may be preheated during the work cycle used for picking up the male mould to be removed from use. In this case, the female moulds in question are available for bending glass sheets immediately once the male mould to be used has been delivered to the press bending station.

The solution set forth may be applied to both in new apparatuses for bending glass sheets and in apparatuses currently in use for bending glass sheets. The conveyors needed in new apparatuses are designed to cope with the total weight of the male mould, typically weighing approximately 700 to 1500 kg, and the trolley needed to carry it as well as possible support structures on the trolley meant to support the male mould on the trolley. On apparatuses already in use, it may be necessary to replace the conveyors with new conveyors that can take the total weight of the male mould and the trolley used to carry it and the possible support structures on the trolley meant to support the male mould on the trolley. If the frame structure of the apparatuses already in use can support the total weight of the male mould and the trolley needed to carry it and the possible support structures on the trolley meant to support the male mould on the trolley, it may be necessary to replace only the rollers and/or roller bearings of the conveyors with new components that can sustain the total weight of the male mould and the trolley needed to carry it and the possible support structures on the trolley meant to support the male mould on the trolley.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. An apparatus for bending glass sheets, the apparatus comprising:
   a first mould trolley that includes a female mould in which the glass sheet is placed, a second mould trolley for removing a first male mould, and a third mould trolley for carrying a second male mould that is intended to replace the first male mould;
   at least one conveyor to transport the first mould trolley, the second mould trolley and the third mould trolley;
   a loading station for loading the glass sheet into the first mould trolley, the loading station being located along the at least one conveyor at a first location;
   at least one preheating compartment for heating the glass sheet to be bent, wherein the at least one preheating compartment is disposed along the at least one conveyor at a second location,
   a press bending station located along the at least one conveyor at a third location, wherein the first, second and third locations are different and spaced apart from one another and the second location is between the first location and the third location, the press bending station comprising the first male mould to bend the glass sheet by pressing the glass sheet by means of the first male mould, the glass sheet brought to the press bending station by the first mould trolley and through the at least one preheating compartment heating the glass sheet prior to delivery to the press bending station;
   wherein the at least one conveyor is configured such that the first mould trolley, the second mould trolley and the third mould trolley must pass through the at least one preheating compartment before entering the press bending station, wherein the at least one conveyor transports the second mould trolley, which is empty, to the press bending station for removing the first male mould from the press bending station; and at least one control unit to control the functions of the apparatus, the at least one control unit being configured to control the replacing of the first male mould being used at the press bending station with the second male mould to be used next at least so that the at least one control unit is configured to control the running of the second mould trolley to the press bending station in order to receive the first male mould to be removed from use on said second mould trolley, and to control the running of said second mould trolley from the press bending station to carry the first male mould removed from use away from the press bending station, and that the at least one control unit is configured to control the running of the third mould trolley through the at least one preheating compartment to the press bending station in order to carry the second male mould to be brought into use to the press bending station;

wherein the at least one conveyor is constructed such that the first mould trolley, the second mould trolley and the third mould trolley are transported away from the press bending station to a fourth location that is remote from the third location, whereby the third location is between the second location and the fourth location.

2. An apparatus as claimed in claim 1 for bending glass sheets, wherein each of the second mould trolley and the third mould trolley comprises a custom-made trolley for the purpose of carrying one of the first male mould and the second male mould.

3. An apparatus as claimed in claim 1 for bending glass sheets, wherein the press bending station comprises an operating mechanism to support and vertically move each of the first male mould and the second male mould whereby each of the first male mould and the second male mould is lowered by means of the operating mechanism to at least one lower position to bend the glass sheet positioned under each of the first male mould and the second male mould by pressing the glass sheet, and back upwards to at least one upper position to end said pressing, and wherein the at least one control unit is configured to control the operation of the press bending station at least so that the first male mould to be removed from use may be lowered substantially vertically downwards by the operating mechanism to be supported by the first mould trolley suitable for carrying the first male mould, and may be released from the operating mechanism, wherein the at least one control unit is configured to control the operation of the press bending station at least so that the second male mould to be brought into use may be brought to be supported by the operating mechanism by lowering the operating mechanism not provided with the first male mould substantially vertically downwards to bring the operating mechanism in contact with and fastening it to the second male mould to be brought into use.

4. An apparatus as claimed in claim 3 for bending glass sheets, wherein the at least one control unit is configured to control the operation of the press bending station at least by delivering the second mould trolley suitable for carrying the first male mould to the press bending station in order to receive the first male mould to be removed from use, lowering the operating mechanism downwards to at least one first lower position so that the first male mould to be removed from use is placed to be supported by the second mould trolley receiving the first male mould to be removed from use, lowering the operating mechanism further down to at least one second lower position so that the operating mechanism detaches from the first male mould to be removed from use, moving the second mould trolley supporting the first male mould to be removed from use at least horizontally so that the operating mechanism is raisable upwards to at least one upper position without the operating mechanism re-attaching to the first male mould to be removed from use, raising the operating mechanism to at least one upper position without the operating mechanism re-attaching to the first male mould to be removed from use, and moving the second mould trolley supporting the first male mould to be removed from use away from the press bending station.

5. An apparatus as claimed in claim 3 for bending glass sheets, wherein the at least one control unit is configured to control the operation of the press bending station at least by moving the third mould trolley suitable for carrying the second male mould and supporting the second male mould to be brought into use to the press bending station to such a position that the operating mechanism not provided with the first male mould may be lowered downwards to at least one second lower position without the operating mechanism hitting the second male mould to be brought into use, moving the third mould trolley supporting the second male mould to be brought into use at least horizontally so that the operating mechanism is raisable upwards to at least one first lower position so that the operating mechanism may attach to the second male mould to be brought into use, raising the operating mechanism upwards to at least one first lower position so that the operating mechanism attaches to the second male mould to be brought into use, raising the operating mechanism further upwards to at least one upper position so that the second male mould to be brought into use raises, supported by the operating mechanism, off the third mould trolley supporting the second male mould to be brought into use, and the third mould trolley that supported the second male mould brought into use may be removed from the press bending station without the third mould trolley hitting the second male mould brought into use, and removing the third mould trolley that supported the second male mould brought into use from the press bending station.

6. An apparatus as claimed in claim 1 for bending glass sheets, wherein the press bending station comprises at least one other conveyor, which is separate and separately controllable in relation to the at least one conveyor of the apparatus in order to shift the second mould trolley suitable for carrying the first male mould at the press bending station horizontally at the press bending station without affecting the running of at least one other trolley on at least one other portion of the apparatus.

7. An apparatus as claimed in claim 1 for bending glass sheets, wherein
the apparatus for bending glass sheets is a glass bending furnace, whereby said second mould trolley suitable for carrying the first male mould is arranged to run to the press bending station through said at least one compartment heating the glass sheet.

8. An apparatus as claimed in claim 1 wherein the second mould trolley is also configured to carry the second male mould that is intended to replace the first male mould at the press bending station.

9. An apparatus as claimed in claim 1 wherein each of the first mould trolley, the second mould trolley and the third mould trolley is of a first type that is configured to receive the female mould in which the glass sheet is placed.

\* \* \* \* \*